Patented Apr. 6, 1926.

1,579,925

UNITED STATES PATENT OFFICE.

JOHN O. GOODWIN, OF AKRON, OHIO, ASSIGNOR TO THE B. F. GOODRICH COMPANY, OF NEW YORK, N. Y., A CORPORATION OF NEW YORK.

FIBROUS MATERIAL.

No Drawing.   Application filed March 6, 1924. Serial No. 697,390.

*To all whom it may concern:*

Be it known that I, JOHN O. GOODWIN, a citizen of the United States, residing at Akron, in the county of Summit and State of Ohio, have invented a certain new and useful Fibrous Material, of which the following is a specification.

This invention relates to fibrous rubber compositions and to methods of making the same.

My chief objects are to provide a tough, flexible, and absorbent composition of fiber and rubber, and a simple and inexpensive method of making the same. Another object is to provide a method for making a fibrous composition requiring only a small amount of binder material. A more specific object is to provide a composition which may be made from cheap, shoddy, or scrap material. Another object is to provide a fibrous material of sufficient strength and coherence that it may be skived to a thin edge, and may be sewed without danger of the stitches pulling out.

In its preferred form my invention comprises intermingling fibrous material, preferably fluffed cotton, or the like, with comminuted, vulcanized rubber, which may be scrap rubber, and subjecting the mass to heat and pressure whereby it is rendered cohesive. Shredded fabric scrap may be substituted for the cotton.

Although comminuted soft rubber, which includes sponge rubber, produces a composition which is to be preferred in many uses, I have found that by using comminuted hard rubber an absorbent composition of corresponding hardness may be obtained, suitable for use where such qualities are desired.

The fibrous material and comminuted rubber may be mixed in any suitable manner, as by tumbling them together in a closed receptacle, and I obtain the most satisfactory results for flexibility and high absorptive qualities when the mixture is in the proportion of 3 parts fiber to 5 parts of rubber by weight, the finished product then having a high degree of absorbent capacity in conjunction with great strength and flexibility. I have been able to obtain a very strong, cohesive product, however, from a mixture containing more than 50% of fibrous material by weight.

After the ingredients are thoroughly mixed as described, a measured quantity of the mixture is placed in a suitable mold and subjected to heat and pressure. The amount of raw material used to produce a given amount of the finished composition, and the heat and pressure applied, are varied according to the density and absorbent quality desired in the finished product. The heat required to cause the rubber to coalesce may be as high or higher than the usual vulcanizing temperatures, but the mass requires to be heated for only a relatively short interval as compared with the vulcanization of rubber articles, which contributes to the economy effected by my invention.

To increase the absorptiveness of the material thus produced, I roughen or lightly abrade the surface thereof, which raises a nap or exposes the surface fibers of the material.

Although an important advantage of my invention is that it provides a fibrous rubber composition capable of absorbing moisture, it is not wholly limited to the production of highly absorptive compositions. Another advantage is that it provides for manufacturing rubber compositions wherein the amount of rubber is not sufficient to form a cohesive mass that may readily be worked on the usual mill or calender. Thus it makes possible the manufacture of heat resisting packing material having a larger prportion of asbestos fiber than has heretofore been possible to employ.

It also permits the utilization of the large accumulations of vulcanized scrap rubber and trimmings incident to the manufacture of rubber articles, without requiring the same to be "reclaimed". A saving also is effected in the time required for molding the composition, because the rubber binder, being already vulcanized, only requires time to soften and coalesce, usually not exceeding five minutes.

The product is especially adapted for the manufacture of insoles for footwear, where its absorptive quality is advantageous. It finds another advantageous use as a body or backing for oil-cloth or linoleum, its porosity providing for good adhesion with an ornamental surface layer.

Modifications may be resorted to without departing from the scope of my invention, and I do not limit my claims wholly to the specific composition or the exact procedure described.

I claim:

1. An absorbent composition of fibers and partially coalesced particles of pre-vulcanized rubber.

2. An article made of an absorbent composition of fibers and partially coalesced particles of pre-vulcanized rubber and having a surface nap of said fibers.

3. An absorbent composition comprising fibers and partially coalesced particles of pre-vulcanized rubber containing more than 50% of fiber by weight.

In witness whereof I have hereunto set my hand this 29th day of February, 1924.

JOHN O. GOODWIN.